Fig.1.

INVENTOR
Raymond H. Glatthorn
BY
ATTORNEY

Sept. 28, 1965  R. H. GLATTHORN  3,209,120
METHOD FOR WELDING TUBE TO PLATE AND APPARATUS
FOR PRACTICING METHOD
Filed Aug. 23, 1962                                7 Sheets-Sheet 7

United States Patent Office 3,209,120
Patented Sept. 28, 1965

3,209,120
METHOD FOR WELDING TUBE TO PLATE AND APPARATUS FOR PRACTICING METHOD
Raymond H. Glatthorn, Media, Pa., assignor to Westinghouse Electric Corporation, Pittsburgh, Pa., a corporation of Pennsylvania
Filed Aug. 23, 1962, Ser. No. 219,038
10 Claims. (Cl. 219—125)

This invention relates to metals joining and has particular relationship to joining of tubes to a plate. In the welding of tubes to a plate, the practice is to rotate a non-consumable electrode about the joint with an arc fired between the joint and the tip of the electrode. In many situations a filler wire is supplied to the joint to build up a fillet.

It is necessary in the power and related industries to fabricate such apparatus as heat exchangers in which a large number, sometimes as high as several thousand, of tubes are welded into a plate. The plate may be very large, as high as 10 or 20 feet in diameter and the positioning of the welding electrode and the supply of filler wire in proper relationship to the numerous joints to be welded presents difficulties. Usually a very hot corrosive liquid flows through the tubes and it is essential that the leakage of corrosive liquid from the tubes into the region bounded by the plate be suppressed. The joints between the tubes and the plate must then be fluid tight. The severity of this demand for fluid tigtheners is enhanced by the circumstance that the liquid is at a high pressure of several thousand pounds per square inch.

It is an object of this invention to provide apparatus which shall be readily operable to fabricate a tube-plate assembly particularly in situations in which the number of tubes is high and it is a specific object of this invention to provide such apparatus in which the tubes shall be sealed fluid tight into the plate and the seals shall be capable of withstanding high pressures.

In accordance with a specific aspect of this invention, apparatus is provided for producing a tube-plate assembly, particularly for a multi-tube heat exchanger, which includes a movable carriage carrying a welding Gun Assembly that may be readily set so that the gun is in welding relationship with each of the numerous joints in its turn. Specifically, this apparatus includes a Carriage Mount along which the Carriage is movable in one direction. The Mount itself is movable on a Support in a second direction usually at right angles to the first direction. The Support is movable on a track, on or near the outer periphery of the plate into which the tubes are to be welded. The gun is mounted in the Carriage rotatable about an axis.

Figure 1:
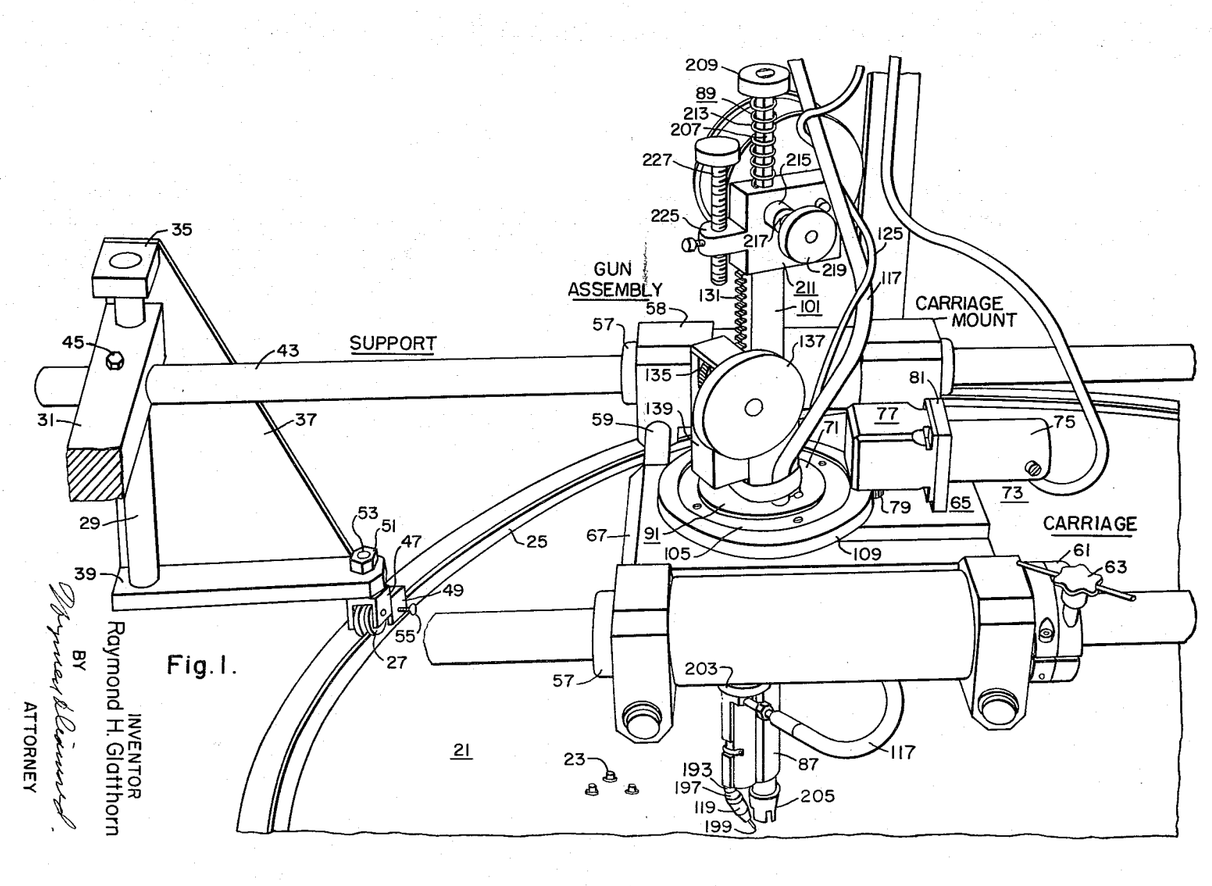
FIGURE 1 is a view in perspective of a preferred embodiment of this invention.

Another aspect of this invention concerns the Gun Assembly. Such an assembly in accordance with the teachings of the prior art for welding tubes into a plate is typified by Apblett 2,908,805. In such apparatus, a mandrel is inserted in the tube and a welding electrode (67—FIG. 1) is rotated about this mandrel. An arc is fired between the electrode and the plate and the tube to be welded and as the electrode rotates, it produces a fused joint. Difficulty has been encountered in producing uniformly reliable high-pressure fluid-tight joints between a large number of tubes and a plate with such prior-art apparatus and it is a specific object of this invention to overcome this difficulty.

This aspect of this invention arises from the discovery that the inner surface and the outer surface of each of the numerous tubes may not be precisely coaxial. An electrode such as Apblett's 67 (FIG. 1) rotated about an axis coaxial with the axis of the inner surface of each tube may then in its different positions around the periphery of the joint to be welded be at different distances from the joint and uneven fusion of the metal at the joint may take place. This results in leaky joints. In accordance with one of the specific aspects of this invention then, a method for joining a tube to a plate by rotating an electrode about the joint between the tube and the plate and producing an arc to fuse the metal at the joint is provided in the practice of which the axis of rotation of the electrode is maintained coaxial not with the axis of the inner surface of the tube but with the axis of the outer surface. The electrode as it rotates about the joint is then maintained at substantially the same distance from the joint and a uniform fluid-tight weld is produced. Apparatus according to this invention is provided in which the Gun assembly includes facilities for centering the axis about which the gun rotates coaxial with the external surface of each of the tubes in its turn as such tube is to be welded. The Carriage in which the gun is mounted may, once the assembly is centered for welding a tube, be locked on the Carriage Mount, the Carriage Mount may be locked on the Support and the Support on the track so that the gun remains precisely centered. After the Gun Assembly is so locked, the welding operation may be carried out.

The novel features considered characteristic of this invention are discussed generally above. For a better understanding of this invention both as to its organization and as to its method of operation together with additional objects and advantages thereof, reference is made to the following description taken in connection with the accompanying drawings, in which.

Figure 2:
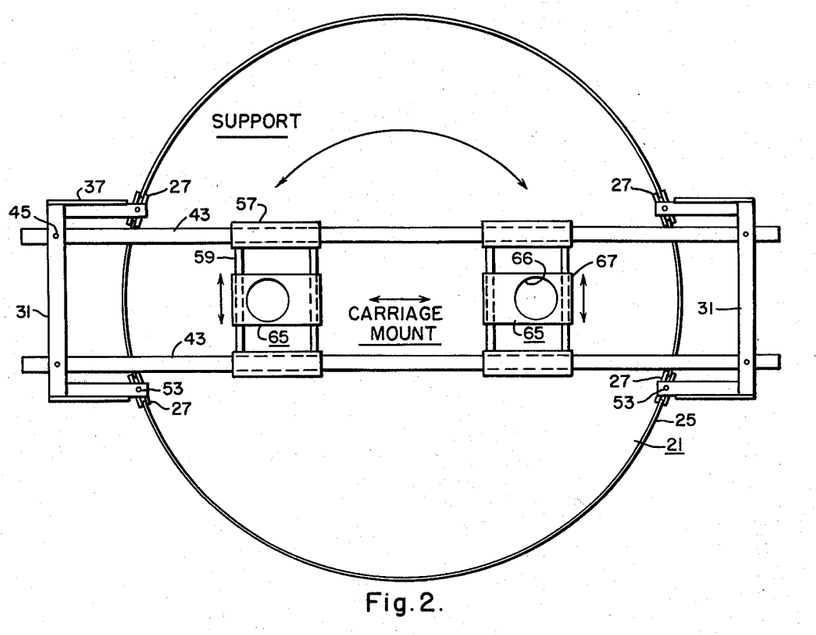
FIG. 2 is a view in top elevation of this embodiment with the Gun Assembly removed.

Typically, in the practice of this invention, a generally circular tube-plate assembly (FIGS. 1 and 2) is fabricated. This assembly includes a generally circular plate 21 into which a large number of tubes 23 are to be sealed fluid tight. Around the periphery of the plate 21 there is a track 25 which extends generally at right angles to the plate 21.

The apparatus in accordance with this invention includes a Support suspended over the plate 21 and provided with rollers 27 which rotatably engage the upwardly extending track 25 around the periphery of the plate 21. This apparatus also includes a Carriage movably supported on a Carriage Mount which is in turn movable on the Support. The movement on the Carriage Mount is generally at right angles to the movement on the support. This apparatus also includes a Gun Assembly which is rotatably mounted about an axis generally perpendicular to the Carriage.

Figure 3:
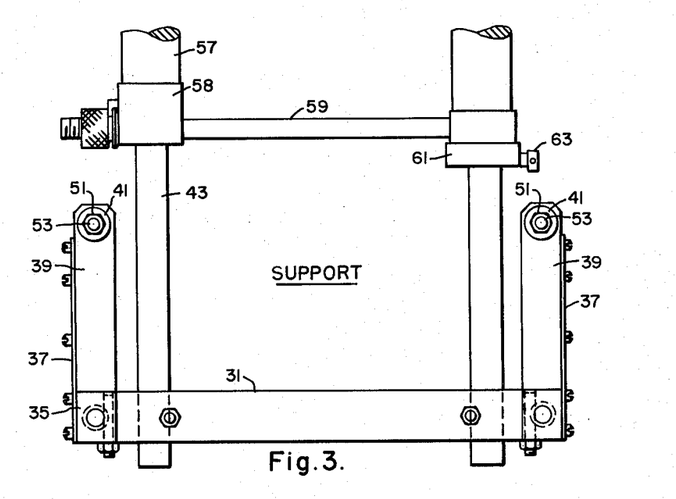
FIG. 3 is a view in top elevation of the Support for the Carriage Mount of this embodiment with this invention.
Figure 3A:
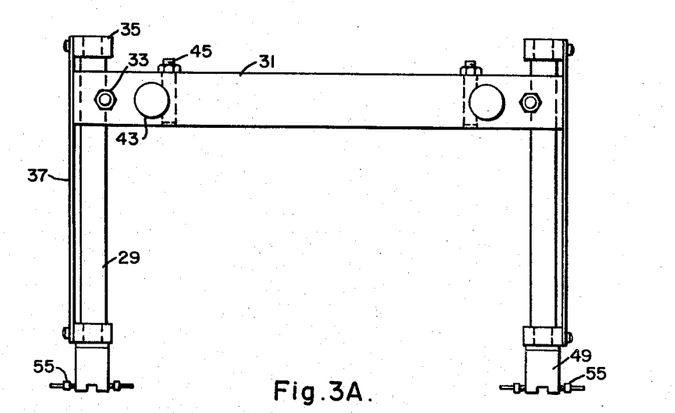
FIG. 3A is a view in end elevation of this Support.
Figure 3B:
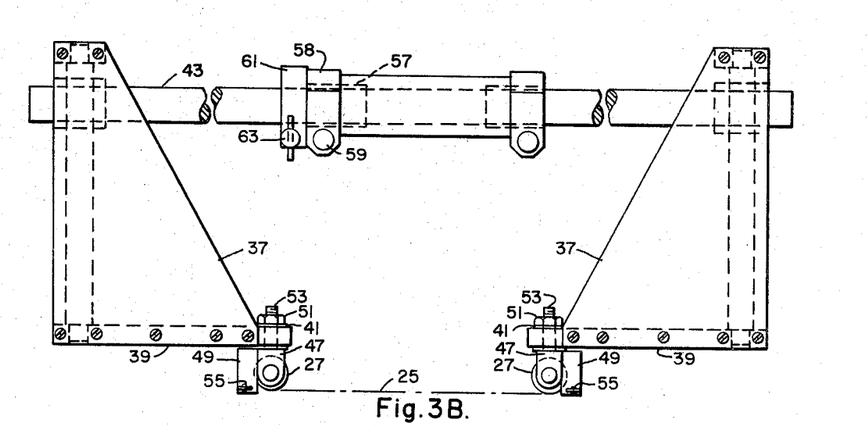
FIG. 3B is a view in side elevation of this support.

The Support (FIGS. 3, 3A, 3B) includes a plurality of pairs of posts 29 diametrically disposed with respect to the plate 21. Each pair of posts carries an end bar 31 near its upper end which is keyed to the posts 29 by grooved bolts 33. Each post 29 also carries a relatively short bar 35 at each end. A spreader plate 37 is secured to each of these bars 35. Each spreader plate 37 has secured to the end thereof nearest the plate 21 a leg 39 from the end of which the grooved roller 27 is pivotally suspended in suitable bearings 41. The grooved roller 27 engages the track 25 around the plate 21 and is capable of rolling along this track 25. Between the end bars 31 of the Support, a pair of circularly cylindrical tracks 43 are secured. The tracks 43 are keyed to the end bars 31 by grooved bolts 45 and form the Support into a rigid unit. The support may be positioned with the tracks 43 in any orientation with respect to the plate 21 by movement of the rollers 21 along the track 25.

Each roller 27 is rotatably suspended from bearing 41 in a yoke 47 (FIG. 3B) which is pivotally suspended from the projecting end of the associated leg 39. A yoke block 49 is secured to the yoke. Each yoke block 49 is grooved to permit the rotation of the associated roller 27. Each yoke is pivotal in the bearing 41 to permit movement along the track 25 but is capable of being locked in any position by a lock nut 51 which engages a pin 53 from which the yoke extends. In addition, each yoke block 49 carries a pair of thumb screws 55 at its lower end. The thumb screws 55 serve to lock the Support on the track 25 in any position. In the practice of this invention, the Support is set and locked in a position and the joints which can be reached in this position are welded.

The Carriage Mount includes two pairs of ball bushings 57. The casings 58 for the ball bushings 57 of the Carriage Mount are provided with depending openings in which cross rails or cross tracks 59 are supported. The Carriage is movably supported on these cross tracks 59. The bushings 57, casings 58 and cross tracks 59 are movable as a unit along the tracks 43 of the Support. A slotted locking sleeve 61 is mounted adjacent one of the bearing casings 58. The sleeve has a depending skirt in which a locking thumb screw 63 is engaged. The sleeve of the adjacent bearing 57 which carries the balls extends into the sleeve 61 and is secured to this sleeve by a setscrew (not shown) which passes through the sleeve 61. The sleeve 61 is thus movable with the Carriage Mount. The sleeve 61 may be locked in any position by the thumb screw 63 thus clamping the adjacent sleeve 61 to the adjacent track 43. This locks the Carriage Mount in any position on the tracks 43.

The Carriage includes a generally rectangular plate or block 65 from the ends of which ball bushings 67 extend. These ball bushings 67 movably engage the tracks 59 of the Carriage Mount and serve to suspend the Carriage. The block 65 has a recess 66 (FIG. 2) in which the fixed race 69 of a ball bearing 71 (FIG. 1) is secured. The Gun Assembly is rotatable in this ball bearing 71.

Figure 4:
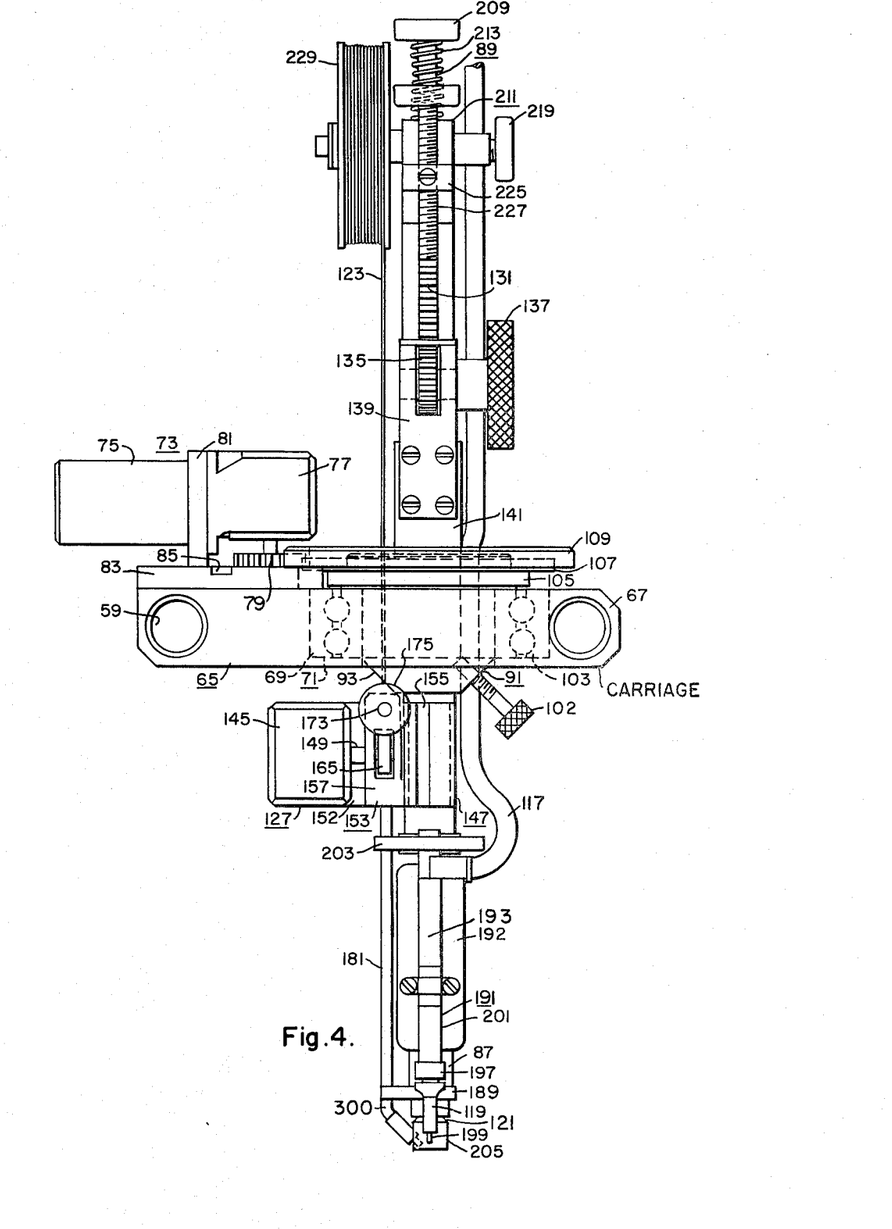
FIG. 4 is a view in side elevation showing the Carriage and the Gun Assembly of this embodiment.

On one surface of the block 65 opposite to the end near which the ball-bearing recess 66 is provided, the drive 73 for rotating the Gun Assembly is mounted. This drive 73 includes a motor 75 and a gear box 77 from which a driving pinion or gear 79 extends. The motor 77 is mounted on a plate 81 which is secured in a V-groove on an adjustable slide guide 83 on the surface of the block 65 and is locked in any position by a slide stop 85 (FIG. 4) engageable with the slide guide 83.

A split locking sleeve 86 (FIG. 5) is mounted on one of the tracks 59 to engage the ball bushing sleeve 88 on one side and the track 59 on the other side. The sleeve 86 is secured to the ball bushing sleeve in engagement with it and moves along the track 59 with this sleeve 88. The sleeve 86 may be locked on the track 59 by a thumb screw 90 thus locking the Carriage in a set position.

Figure 8:
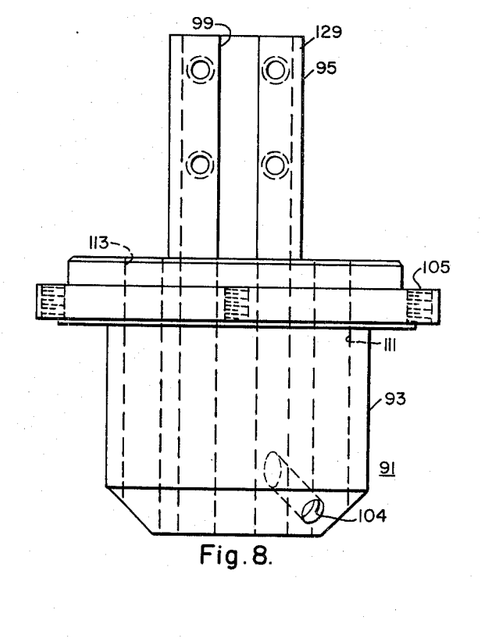
FIG. 8 is a view in side elevation of the spindle mount of this assembly.
Figure 9:
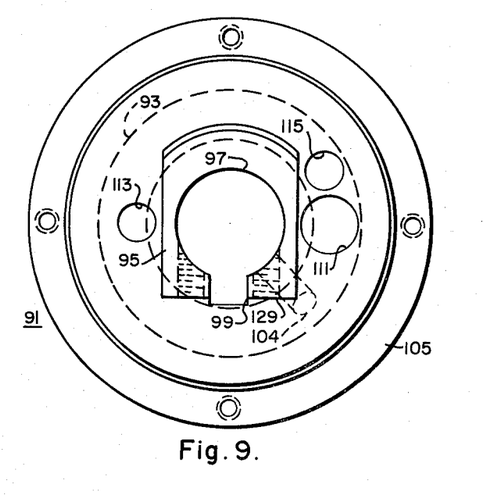
FIG. 9 is a view in top elevation of this Mount.

The Gun Assembly includes a spindle 87, a plunger shaft 89 (FIG. 6) within the spindle 87 (FIG. 7) for centering the Gun Assembly, and a spindle mount 91 (FIGS. 8 and 9). The spindle mount 91 is composed of a generally cylindrical flanged block 93 tapered at the end from which a generally rectangular stem 95 extends. The stem 95 and block 93 are provided with a central opening 97. A keyway 99 communicates with this opening extending through the stem 95 and partly through the block 93. The spindle 87 extends slidably through the central opening (FIGS. 4 and 5) and carries a cooperating rack 101 which engages the keyway 99. The spindle mount 91 may be locked in any position on the spindle 87 by a thumb screw 102 (FIG. 4) which may be screwed into a threaded opening 104 in the tapered portion of the block 93.

The inner or rotating race 103 of the bearing 71 in the Carriage is pressed onto the cylindrical portion 93 of the spindle mount engaging a shoulder 105 from the flange. A gear 107 is secured to the opposite face of the shoulder 105. This gear 107 meshes with the drive gear 79. The gear 107 is provided with a suitable cover 109 which has an opening therein permitting the meshing of the drive gear 79 and the gear 107.

The spindle mount has a plurality of longitudinal openings 111, 113, 115 displaced from the central opening 97. Through one 111 of these openings a power-gas cable 117 (FIG. 1) for supplying potential to the nonconsumable electrode and also for transmitting gas through the nozzle or cup 119 of the gun 121 passes. Through another 113 of these openings, the filler wire 123 is transmitted and through a third 115 and cable 125 for supplying power to the drive 127 for the filler wire 123 is passed.

The spindle 87 (FIG. 7) is a shouldered hollow rod having a keyway 129 near its upper end. To this keyway the rack 101 is secured. The teeth 131 of the rack 101 extend from the keyway 129. This rack 101 is slidable into and out of the keyway 99 of the spindle mount 91. On rotation of the spindle mount, the rack 101 and the spindle 87 are rotated. A pinion 135 operable by a knurled knob 137 is in engagement with the teeth 131 of the rods 101. The knurled knob 137 and pinion are rotatably mounted in a bearing block 139 (FIG. 5) which is secured to a flat face 141 of the stem 95 of the spindle mount 91.

Figure 5:
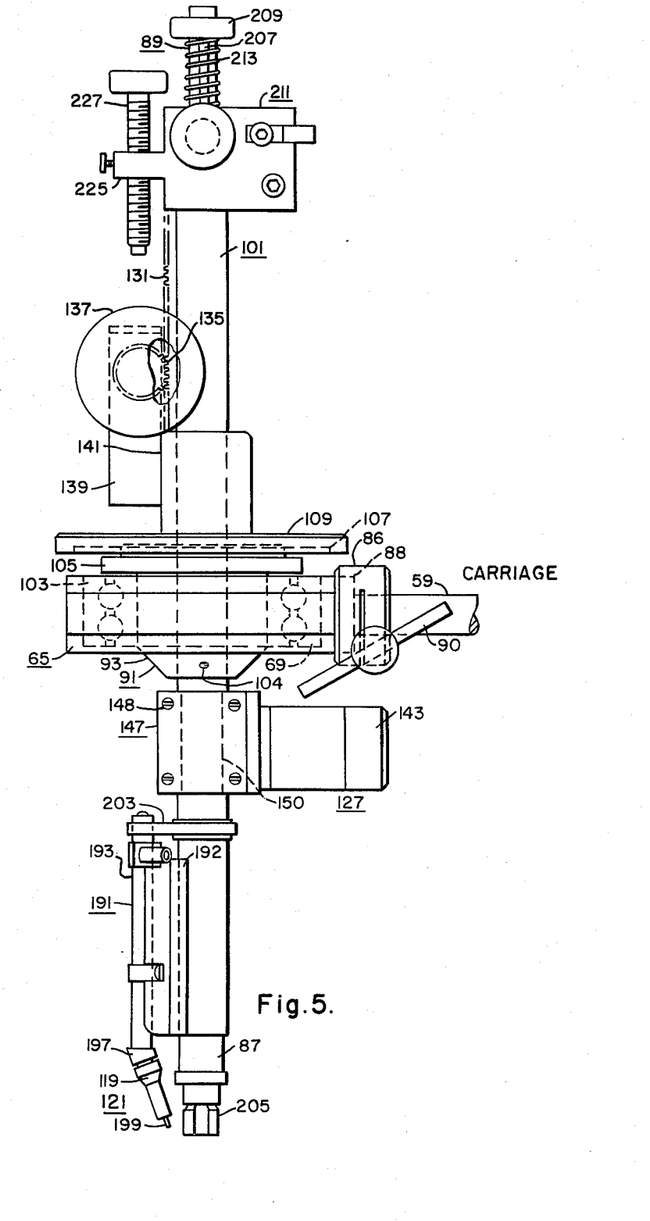
FIG. 5 is a view in end elevation with respect to the Carriage of the portion of this embodiment shown in FIG. 4.
Figures 6, 7:
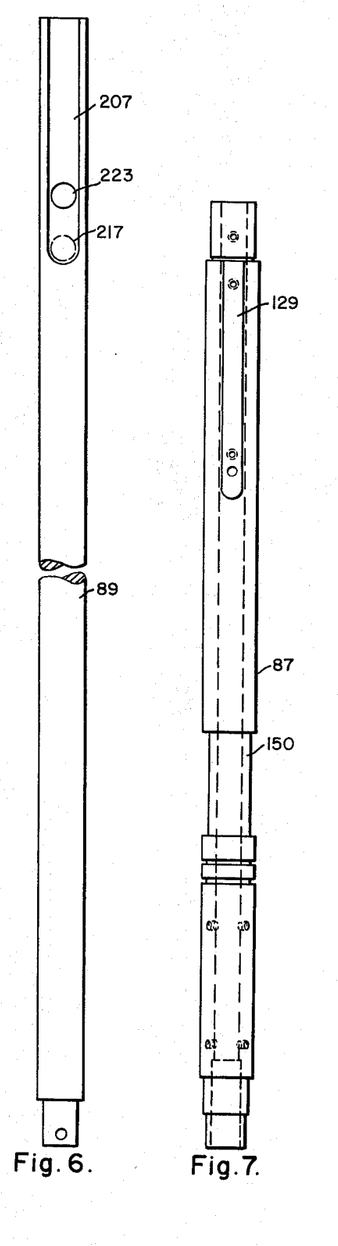
FIG. 6 is a view in side elevation of the plunger shaft which serves for centering the Gun Assembly of this embodiment on a joint to be welded.
FIG. 7 is a view in side elevation of the spindle of the Gun Assembly of this embodiment.
Figure 11:
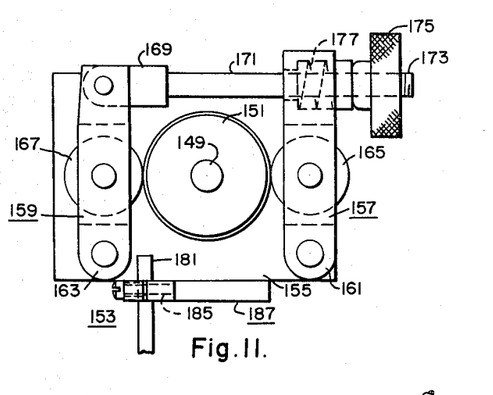
FIG. 11 is a view in side elevation of the pressure drive rolls for the filler rod used in the practice of this invention.

The drive 127 for the filler wire or rod 123 includes a motor 143 (FIG. 5) and gear 145 suspended from a bracket 147 secured to the spindle 87. The bracket 147 consists of two grooved parts (grooves not shown) which are clamped by bolts 148 around a neck 150 of spindle 87 (FIG. 5). The gear box 145 is suspended from a bracket 152 secured to the end of bracket 147. A drive shaft 149 from the gear box 145 drives a grooved roller 151 in the rod-engaging mechanism 153 (FIG. 11). This mechanism 153 includes a plate 155 suspended from the bracket 147 on the spindle 87. This plate carries a pair of slotted pressure arms 157 and 159 pivotally suspended at their tips 161 and 163 respectively from the plate 155 (pivots not shown). The arms 157 and 159 carry pressure rollers 165 and 167 respectively which extend through grooves in the pressure arms. One of the pressure arms 159 is bifurcated at one end and the head 169 of a bolt 171 is pivotally supported in this end. The threaded end 173 of the bolt 171 extends through the other pressure arm 157 and carries a knurled knob 175. The knurled knob 175 is urged outwardly by a spring 177 and may be screwed in against the force of the spring. When the knurled knob 175 is screwed in, it causes pressure to be applied by the pressure rollers 165 and 167 to the rod 123 between the pressure roller 167 and the drive roller 151.

Figure 11A:
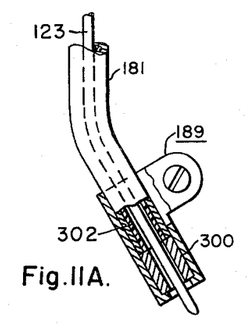
FIG. 11A is a view in longitudinal section showing the tip of the filler-rod supply tube.

The filler rod 123 is transmitted through a tube 181 which is secured by a clamp 183 to the spindle 87 near the lower end of the spindle. At the other end, the tube 181 passes through the projecting portion 185 of a right angle bracket 187 extending from the drive mechanism plate 155 (FIG. 11). The tube 181 extends the upward direction to a point just below the region of engagement of the drive roller 151 and the adjacent pressure roller 167 so that the rod passes directly from this region into the tube 181. The tube 181 is bent at the lower end and a clamp 189 is secured at this end. Within the clamp a carbide wear bushing 300 is secured (FIG. 11A). A liner 302 of a non-galling material such as nylon extends along the full length of the tube 181 to the wear bushing 300.

Figure 12:
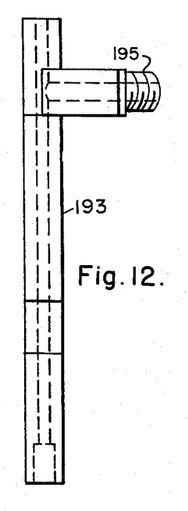
FIG. 12 is a view in side elevation of the electrode tube of the Gun Assembly.
Figure 13:
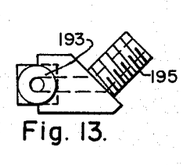
FIG. 13 is a view in end elevation of this tube.

The gun 191 includes an electrode tube 193 (FIGS. 12 and 13) which is hollow and has a T junction near one end from which a nipple 195 extends (FIG. 12). The T-junction nipple 195 and the tube 193 have central openings which communicate.

The nipple 195 is connected to the power-gas cable 117 and the gas is supplied through the nipple and through the electrode tube 193 thence through the gas cup 119 shielding the arc. The power-gas cable has a sheath (not shown) which is connected electrically to the electrode tube 193 and through the electrode tube to the electrode 199, thus supplying power thereto. To the other end of the electrode tube the gas cup 119 is attached. Just above the gas cup a collet for holding a welding electrode 199 is provided. The electrode tube and the filler tube are bent at the ends adjacent the electrode so that the electrode and the attachment on the filler tube are substantially at right angles and the filler is supplied at right angles to the electrode.

Figure 13A:
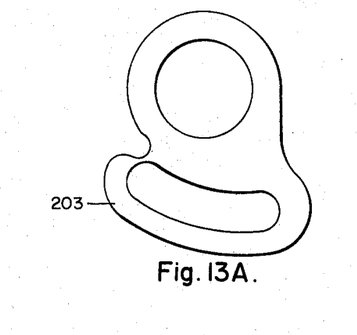
FIG. 13A is a view in top elevation of the cam for setting the position of the welding electrode with reference to the joint to be welded.

To support the gun, an electrode mount 192 is provided. This mount 192 is a bracket secured near the lower end of the spindle and having a groove 201 in which the electrode tube 193 is inserted. The electrode tube 193 is supported in the mount 192 so that it can pivot to a small extent. The distance between the axis of the spindle 87 and the electrode 199 may be varied by this pivoting action. Above the electrode mount 192, a cam 203 (FIGS. 4, 13A) is mounted rotatable on the spindle 87. The end of the electrode tube 193 remote from the gas cup 119 engages this cam 203 and the electrode 199 may be precisely positioned relative to the joint to be welded by rotating the cam 203 and pivoting the mount 192. The filler wire tube 181 extends through the groove of the cam 203, but is out of contact with the cam surface.

Figure 10:
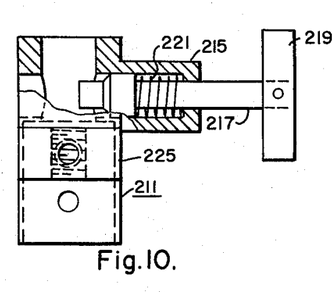
FIG. 10 is a view in end elevation of the bracket which supports the holding mechanism for the plunger shaft.
Figure 10A:
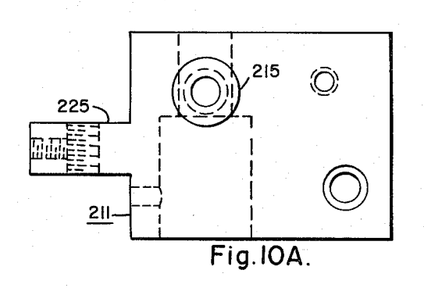
FIG. 10A is a view in side elevation of this bracket.
Figure 14:
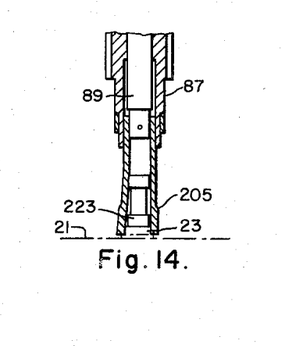
FIG. 14 is a view in longitudinal section showing the manner in which the Gun Assembly is centered.

The plunger 89 is slidable within the spindle 87 and has at its lower end, extending from the spindle, a locator in the form of a spring chuck 205. The plunger has a flattened surface 207 near its end remote from the locator and carries a knob 209 near the end. By pressing down on the knob 209, the plunger 89 is projected over the outer surface of a tube 23 to be welded into the plate 21, the chuck 205 engages the outer surface of the tube 23 and centers the axis of the spindle 87 with reference to the outer surface of the tube 217 (FIG. 14). A bracket 211 is secured to the upper end of the spindle 87. The plunger 89 is urged upwardly by a compression spring 213 engaging the knob 209 at one end and the bracket 211 at the other.

The bracket 211 (FIG. 10) has a projection 215 near its upper end within which a pin 217 from which a knob 219 extends, is slidable. The pin 217 is urged inwardly by a spring 221. The plunger 89 has a transverse hole 223 near the lower end of its flattened portion 207 and when the plunger 89 is pressed downwardly into tube engaging position the pin 217 extending from the bracket 211 enters the hole 223 and locks the plunger 89 in the downward position. The bracket 211 also has an ear 225 in which an adjustable screw 227 is screwed. This screw 227 may be set to limit the position to which the spindle may be lowered by operation of the rack 101 and pinion 135 and the position to which the plunger returns when the pin 217 is retracted from the hole 223. This stop permits presetting of the electrode 199.

In the use of the apparatus, the Support is moved with the rollers 27 rotating and pivoting on the track 25 of the plate 21 to the position in which a plurality of the tubes 23 are to be welded into the plate. In this position, the Support is locked. The Carriage Mount is in this position free to move on the rails or tracks 43 of the Support and the Carriage is free to move on the cross rails or tracks 59 of the Carriage Mount. The stop 227 extending from the bracket 211 is set to the desired height so that the electrode 199 will be at the appropriate distance from the joint to be welded. The knob 209 on the plunger 89 is then pressed downwardly until the plunger 89 is locked by the pin 217 in the bracket 211. The knob 137 for rotating the pinion 135 is then rotated to raise the spindle so that the locator 205 clears the chill post 233 (FIG. 14) in any of the tubes 23 which have been joined or which are in process of being joined. The locator 205 is then set over the chill post 233 in the tube 23 which is to be welded to the plate 21. The knob 137 is then rotated so as to move the locator 205 downwardly to engage the outer surface of the tube 23 (FIG. 14). The spindle 87 is thus set with its axis centered along the axis of the outer surface of the tube 23. The Carriage is then locked on the cross tracks 59 and the Carriage Mount is locked on the tracks 43 of the Support. The knob 219 is then pulled out so as to disengage the pin 217 from the hole 223 and the plunger 89 is retracted. The pinion 135 is now rotated so that the pinion bracket engages the tip of the stop 227. More precise setting of the electrode 199 may be effected by rotating the cam 203. The welding operation is now carried out.

In the manner just described other tubes 23 falling under the Carriage in its various positions may be welded. When the welding of these tubes 23 is completed, the Support may be unlocked, moved to another position and other tubes 23 welded in the plate 21. This operation continues until all of the tubes are welded into the plate.

The apparatus disclosed herein includes within its scope an assembly for welding a large number of tubes 23 into a plate 21 with the welds uniformly and reliably high-pressure fluid tight. Also, a method is provided for welding a peripheral joint with the welding electrode moving about the joint and properly centered with reference to the joint but mechanically disconnected from the joint. In addition, apparatus is provided for centering the spindle 87 about which the electrode 199 is rotated for each joint precisely with reference to the outer surface of the tube 23.

While a preferred embodiment of this invention has been disclosed herein, many modifications thereof are feasible. This invention then is not to be restricted except insofar as is necessitated by the spirit of the prior art.

I claim as my invention:

1. Apparatus for welding a circumferential joint between a tube and a plate, said tube projecting from said plate in the direction of the welding, the said apparatus including a hollow spindle, a welding electrode mounted on said spindle movable around said joint, and centering means, including means engageable in centering relationship with the outer surface of the projecting portion of said tube, removably mounted in said spindle for aligning the axis of movement of said electrode substantially coincident with the axis of said outer surface of said tube.

2. Apparatus for welding a plurality of tubes into a plate comprising a generally circular track encircling said plate, main linear track means mounted on said track movable so that said track means may be set in any selected orientation on said track, auxiliary track means mounted on said main track means movable to be set at any selected position along said main track means, an electrode for welding said tubes to said plate, and mounting means for said electrode mounted on said auxiliary track means movable to be set in any selected position along said auxiliary track means.

3. Apparatus for welding a plurality of tubes into a plate comprising a track encompassing substantially the whole area of said plate, main linear track means mounted on said track movable so that said track means may be set in any selected orientation on said track, auxiliary track means mounted on said main track means movable to be set at any selected position along said main track means, an electrode for welding said tubes to said plate, and mounting means for said electrode mounted on said auxiliary track means movable to be set in any selected position along said auxiliary track means.

4. Apparatus for welding a plurality of tubes into a plate at a plurality of positions of said plate, comprising a gun for welding each of said tubes to said plate, a generally circular track encircling said plate, and mounting means for said gun mounted movable on said track capable of being set in welding relationship to any of said tubes.

5. Apparatus for welding a plurality of tubes into a plate at a plurality of positions of said plate, comprising a gun for welding each of said tubes to said plate, a generally circular track encircling said plate and mounting means for said gun mounted movable on said track capable of being set in welding relationship to any of said tubes, said mounting means extending beyond said track away from said plate so that said gun may be set in welding relationship with tubes in said plate near said track.

6. Apparatus for welding a tube having an axis to a plate comprising a welding gun rotatable about an axis, first means mounting said gun movable in a first direction generally perpendicular to said axis of said tube, second means mounting said gun in a second direction generally perpendicular to said axis of said tube, and means connected to said gun engageable with the external surface of said tube for centering said gun so that said axis of said gun is substantially coincident with said axis of said tube, said first and second means including means for locking said first and second mounting means when said gun is so centered.

7. Apparatus for welding a circumferential joint between a tube and a plate including a hollow spindle, a welding electrode mounted on said spindle movable around said joint, and centering means for said electrode movably mounted in said spindle, means connected to said centering means for projecting said centering means from said spindle into electrode-centering engagement with a tube for aligning the axis of movement of said electrode substantially coincident with the axis of said tube and means connected to said projecting means for retracting said centering means following centering of said electrode preparatory to a welding operation.

8. Apparatus for welding a circumferential joint between a tube and a plate, said tube projecting from said plate in the direction of the welding, the said apparatus including a hollow spindle, a welding electrode mounted on said spindle movable around said joint, and centering means, including means engageable in centering relationship with the outer surface of the projecting portion of said tube for aligning the axis of movement of said electrode substantially coincident with the axis of said outer surface of said tube, the said aligning means being mounted in said spindle movable with respect to said electrode so that it may be retracted out of obstructing relationship to said electrode during a welding operation.

9. Apparatus for welding a tube to a plate with a welding electrode rotatable about the joint of said tube and plate, said tube projecting from said plate in the direction from which the welding is to take place and having therein a chill post for preventing overheating of the weld, the said apparatus comprising means mounting said electrode to rotate, in welding relationship with said joint, about an axis extending through said tube and generally parallel to the axis of said tube, means connected to said mounting means for setting the axis of rotation of said electrode, by reference to the outer surface of the projecting portion of said tube substantially coincident with the axis of the outer surface of the projecting portion of said tube, means connected to said electrode and said joint for firing and maintaining a welding arc between said electrode and joint, and means for rotating said electrode with said arc burning between said electrode and joint to produce a weld.

10. Apparatus for welding a tube, the external surface of which has a circular cross section, to a plate with a welding electrode rotatable in a circular path about the circular joint of said tube and plate, said tube projecting from said plate in the direction from which the welding is to take place, the said apparatus comprising means mounting said electrode to rotate, in welding relationship with said joint, about an axis extending through said tube and generally parallel to the axis of said tube, means connected to said mounting means for setting the axis of rotation of said electrode, by reference to the outer surface of said tube, substantially coincident with the axis of the projecting portion of said tube, means connected to said electrode and joint for firing and maintaining an arc between said electrode and joint, and means for rotating said electrode about said axis of rotation of said electrode, mechanically disconnected from said tube, with an arc burning between said electrode and joint to produce a weld.

References Cited by the Examiner

UNITED STATES PATENTS

| 1,508,711 | 9/24 | Noble | 219—125 |
| 1,801,140 | 4/31 | Chapman | 219—125 |
| 1,884,644 | 10/32 | Ford | 219—125 |
| 1,949,251 | 2/34 | Gilbert | 219—125 |
| 1,978,042 | 10/34 | Dodge | 219—125 X |
| 2,207,787 | 7/40 | Eberle. | |
| 2,496,110 | 1/50 | Thurman. | |
| 2,522,146 | 9/50 | Tichenor et al. | 219—125 |
| 2,675,224 | 4/54 | Hancock. | |
| 2,777,937 | 1/57 | Bryant | 219—125 |
| 2,782,024 | 2/57 | Demmer et al. | |
| 2,908,805 | 10/59 | Apblett et al. | 219—125 |
| 3,135,856 | 6/54 | Stone | 219—125 X |

RICHARD M. WOOD, *Primary Examiner.*

JOSEPH V. TRUHE, *Examiner.*